United States Patent [19]

Patel et al.

[11] Patent Number: 5,223,282
[45] Date of Patent: Jun. 29, 1993

[54] METHODS OF PRODUCING CHEWING GUM USING MOLTEN SORBITOL AND GUM PRODUCED THEREBY

[75] Inventors: Mansukh M. Patel, Downers Grove; Jeffrey S. Hook, Palos Hills, both of Ill.

[73] Assignee: Wm. Wrigley Jr. Company, Chicago, Ill.

[21] Appl. No.: 883,131

[22] Filed: May 14, 1992

Related U.S. Application Data

[63] Continuation-in-part of Ser. No. 649,842, Feb. 1, 1991, abandoned.

[51] Int. Cl.⁵ ............................................. A23G 3/30
[52] U.S. Cl. ...................................... 426/3; 426/658
[58] Field of Search .................... 426/3, 548, 4, 5, 6, 426/804, 658

[56] References Cited

U.S. PATENT DOCUMENTS

| | | | |
|---|---|---|---|
| 3,857,965 | 12/1974 | Ream | 426/3 |
| 3,973,041 | 8/1976 | DuRoss | 426/3 |
| 4,166,134 | 8/1979 | Witzel et al. | |
| 4,263,327 | 4/1981 | Pedersen et al. | |
| 4,292,337 | 9/1981 | Andersen | |
| 4,388,328 | 6/1983 | Glass | |
| 4,614,654 | 9/1986 | Ream et al. | |
| 4,741,905 | 5/1988 | Huzinec | |
| 4,824,680 | 4/1989 | Bernatz et al. | 426/3 |
| 4,904,482 | 2/1990 | Patel et al. | |

FOREIGN PATENT DOCUMENTS 0347121 12/1989 European Pat. Off.

OTHER PUBLICATIONS

Food Chemicals Codex, 1981, pp. 308-309.

*Primary Examiner*—Joseph Golian
*Assistant Examiner*—Leslie Wong
*Attorney, Agent, or Firm*—Willian Brinks Olds Hofer Gilson & Lione

[57] ABSTRACT

Molten sorbitol is disclosed as a humectant for chewing gum. The chewing gum is prepared by providing a chewing gum base at a level of about 5% to about 80% of the chewing gum composition; providing a bulking agent at a level of about 5% to about 80% of the chewing gum composition; providing a flavoring agent at a level of about 0.1% to about 10% of the chewing gum composition; providing molten sorbitol at a level of about 0.25% to about 2.7% of the chewing gum composition; and mixing the gum base, bulking agent, flavoring agent and molten sorbitol into the chewing gum composition. Chewing gum made with about 0.25% to about 2.7% molten sorbitol is also disclosed.

16 Claims, 6 Drawing Sheets

METHODS OF PRODUCING CHEWING GUM USING MOLTEN SORBITOL AND GUM PRODUCED THEREBY

CROSS REFERENCE TO RELATED APPLICATION

The present application is a continuation-in-part application of Ser. No. 07/649,842, filed Feb. 1, 1991, now abandoned incorporated herein by reference.

BACKGROUND OF THE INVENTION

The present invention relates to methods of making chewing gum, and more particularly to such methods using molten sorbitol, and the resulting chewing gum.

Sorbitol is commonly used as a humectant in a variety of products. The sorbitol may be in crystalline (powdered) form, and a 70% solution of sorbitol in water is also a common humectant.

Humectants in chewing gum have the effect of holding onto the moisture that is in the gum. This keeps the gum softer and more flexible when it is stored under dry storage conditions. Generally, since chewing gum packages are not hermetically sealed, air transfers in and out of the gum package. If the air is dry, the gum will dry out and become brittle and hard. A humectant like sorbitol is added to chewing gum to reduce the loss of moisture and keep the gum from becoming brittle during storage. Glycerin is also a humectant and reduces the loss of moisture during storage.

U.S. Pat. No. 3,857,965 discloses the use of molten sorbitol in sugarfree chewing gum. However, the sorbitol is used in high quantities as a bulking agent. U.S. Pat. No. 4,263,327 discloses the use of an evaporated sorbitol syrup in sugarless chewing gum. U.S. Pat. No. 4,292,337 discloses dissolved sorbitol and xylitol in a sugarfree confectionery. In U.S. Pat. Nos. 4,166,134, 4,824,680, and 4,614,654, sorbitol is used as a humectant in sugar gums, but added in unique methods.

At least one commercial sugar gum currently uses crystalline sorbitol as a humectant. However, additional improvements in long term storage flexibility and moisture retention are desirable.

SUMMARY OF THE INVENTION

It has surprisingly been found that melting sorbitol prior to mixing it into gum produces a gum that has improved softness and flexibility compared to the same gum with the sorbitol added in powdered form.

The present invention thus includes a method of producing a chewing gum composition comprising the steps of: providing a chewing gum base at a level of about 5% to about 80% of the chewing gum composition; providing a bulking agent at a level of about 10% to about 80% of the chewing gum composition; providing a flavoring agent at a level of about 0.05% to about 5% of the chewing gum composition; providing molten sorbitol at a level of about 0.25% to about 4% of the chewing gum composition; and mixing the gum base, bulking agent, flavoring agent and molten sorbitol into the chewing gum composition. The invention also includes gums made using about 0.25% to about 4% molten sorbitol.

DETAILED DESCRIPTION OF THE INVENTION AND PREFERRED EMBODIMENTS

Figure 1:
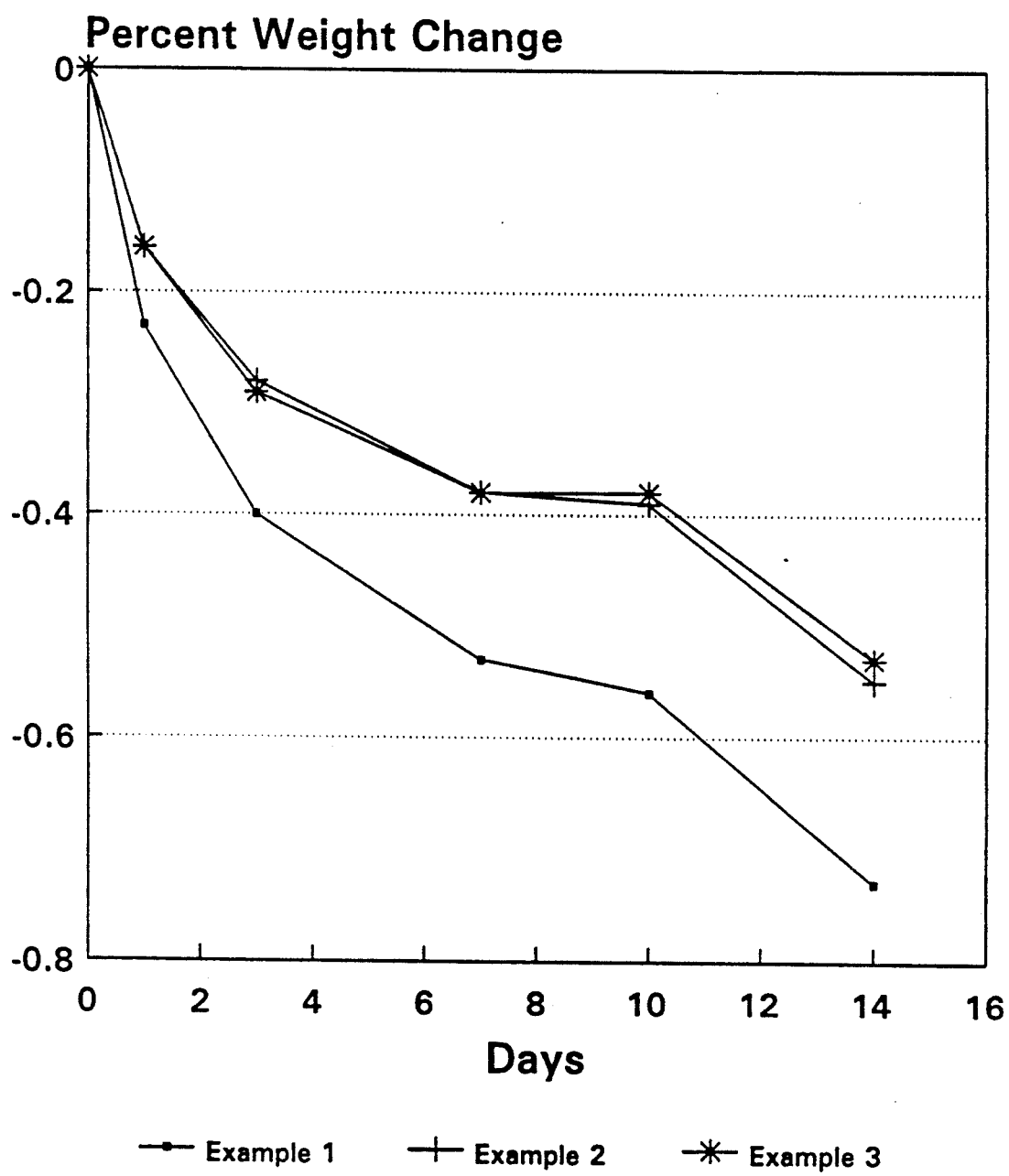
FIG. 1 shows a comparison graph of weight-loss data for three samples of gum, one without any sorbitol, one using powdered sorbitol and one using the same amount of molten sorbitol.

Most chewing gum formulations may benefit from the present invention. However, sugar formulations are preferred. As used herein, the term chewing gum includes chewing gum, bubble gum and the like. All percents are given in weight percent unless specified otherwise.

It was anticipated that when sorbitol powder is melted and used as a humectant, its effect would be similar to that produced using powdered sorbitol. A weight loss study comparing gum with and without powdered sorbitol showed less moisture loss when the gum contained sorbitol. Likewise, when the sorbitol was melted and added to gum, the same improvement in reduced moisture loss resulted. However, it was very surprising to discover that gum made with molten sorbitol better retains its softness and flexibility compared to gum made with powdered sorbitol, even though the moisture loss is the same. It appears that molten sorbitol has a softening effect other than its humectant effect on chewing gum.

A possible explanation for this is that molten sorbitol is modified from a crystalline state to a more amorphous state that may allow it to act as a gum plasticizer or softening agent.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 80 percent by weight of the gum. More preferably the insoluble gum base comprises between 10 and 60 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise sweeteners, softeners, flavoring agents and combinations thereof. The sweeteners often fulfill the role of bulking agents in the gum. In sugar gums, typical bulking agents include sucrose, dextrose, maltose, dextrin, dried invert sugar, fructose, levulose, galactose, corn syrup solids and the like, alone or in combination. The present invention may have use in sugarless gums. In sugarless gums, sugarless sweeteners such as sorbitol, mannitol, xylitol, hydrogenated starch hydrolysates, maltitol and the like, alone or in any combination, may be used. The bulking agent generally will comprise from about 5 percent to about 80 percent of the gum composition, and more preferably about 20 percent to about 70 percent of the gum composition.

Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, the gum may contain a binding agent such as hydrogenated starch hydrolysates, corn syrup and combinations thereof.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chucks or casting into pellets.

Generally, the ingredients are mixed by first melting the gum base and adding it to the running mixer. The base may also be melted in the mixer itself. Color or emulsifiers may also be added at this time. The molten sorbitol of the present invention is preferably added with the color and emulsifier while the gum base is still hot. (Optionally, the molten sorbitol may be premixed with the heated gum base at a temperature of about 200° F.–220° F.) Less preferably, the molten sorbitol may be added at any time during the mixing process. The bulking agent may be added to the mixer in portions. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

EXAMPLES 1–3

The following gum formulas were made and sheeted into sticks.

|  | Comparative Example 1 | Comparative Example 2 | Inventive Example 3 |
| --- | --- | --- | --- |
| Base | 20.7 | 20.7 | 20.7 |
| Sugar | 54.2 | 51.5 | 51.5 |
| Sorbitol | — | 2.7 | 2.7 |
| Corn syrup | 13.2 | 13.2 | 13.2 |
| Dextrose Monohydrate | 10.1 | 10.1 | 10.1 |
| Glycerin | 1.2 | 1.2 | 1.2 |
| Spearmint flavor | 0.6 | 0.6 | 0.6 |
|  | 100.0 | 100.0 | 100.0 |

Comparative Example 1 had no sorbitol added. Comparative Example 2 had powdered sorbitol added. Inventive Example 3 had molten sorbitol added. The molten sorbitol was made by melting the powdered sorbitol in a beaker on a hot plate and holding it 5° C. above its melting point at about 95° C. until it was ready for use.

After sheeting into sticks, samples were stored at 75° F. and 35% RH for a weight loss study and a Taber stiffness study. For the weight loss study, individual bare sticks were weighed at 0 days, and reweighed at 1, 3, 7, 10 and 14 days. Results of the weight loss test are shown graphically in FIG. 1. For the Taber stiffness test, three sticks were tested at 0, 1, 4, 10, 14, and 21 days. The Taber stiffness value is a measure of the chewing gum's resistance to bending. The longer the Taber stiffness value remains low, the longer the chewing gum remains flexible. Low Taber values after storage of the gum are thus an indication of improved shelf life. The Taber stiffness values were measured by the Taber V-5 stiffness tester method, Model 150B available from Taber Instrument Corp., North Tonawanda, N.Y. Results of the Taber stiffness test are reproduced below.

TABLE 1

Taber Stiffness
Bare Sticks at 35% R.H. (n = 3)

|  | Comparative Example 1 | Comparative Example 2 | Inventive Example 3 |
| --- | --- | --- | --- |
| Day 0 | 10.3 ± 1.5 | 10 ± 0 | 7.0 ± 0 |
| Day 1 | 36.3 ± 3.2 | 19.6 ± 0.6 | 15.0 ± 1.0 |
| Day 4 | 37.4 ± 0.6 | 22.6 ± 3.0 | 17.0 ± 1.0 |
| Day 10 | 56.0 ± 1.0 | 31.0 ± 3.6 | 25.0 ± 1.7 |
| Day 14 | 76.0 ± 6.9 | 48.3 ± 1.15 | 30.0 ± 4.4 |
| Day 21 | 86.2 ± 6.0 | 62.1 ± 2.30 | 38.3 ± 5.2 |

As noted for the Day 0 results, there are slight batch-to-batch variations in the Taber stiffness. To eliminate the effect of this variation, Day 0 Taber values were subtracted from the other Taber data to give the Tabor change from Day 0. The Taber changes values are shown below and graphically in FIG. 2.

TABLE 2

|  | Comparative Example 1 | Comparative Example 2 | Inventive Example 3 |
| --- | --- | --- | --- |
| Day 0 | — | — | — |
| Day 1 | 26.0 | 9.6 | 8.0 |
| Day 4 | 27.1 | 12.6 | 10.0 |
| Day 10 | 45.7 | 21.0 | 18.0 |
| Day 14 | 65.7 | 38.3 | 23.0 |
| Day 21 | 75.9 | 52.1 | 31.3 |

Figure 2:
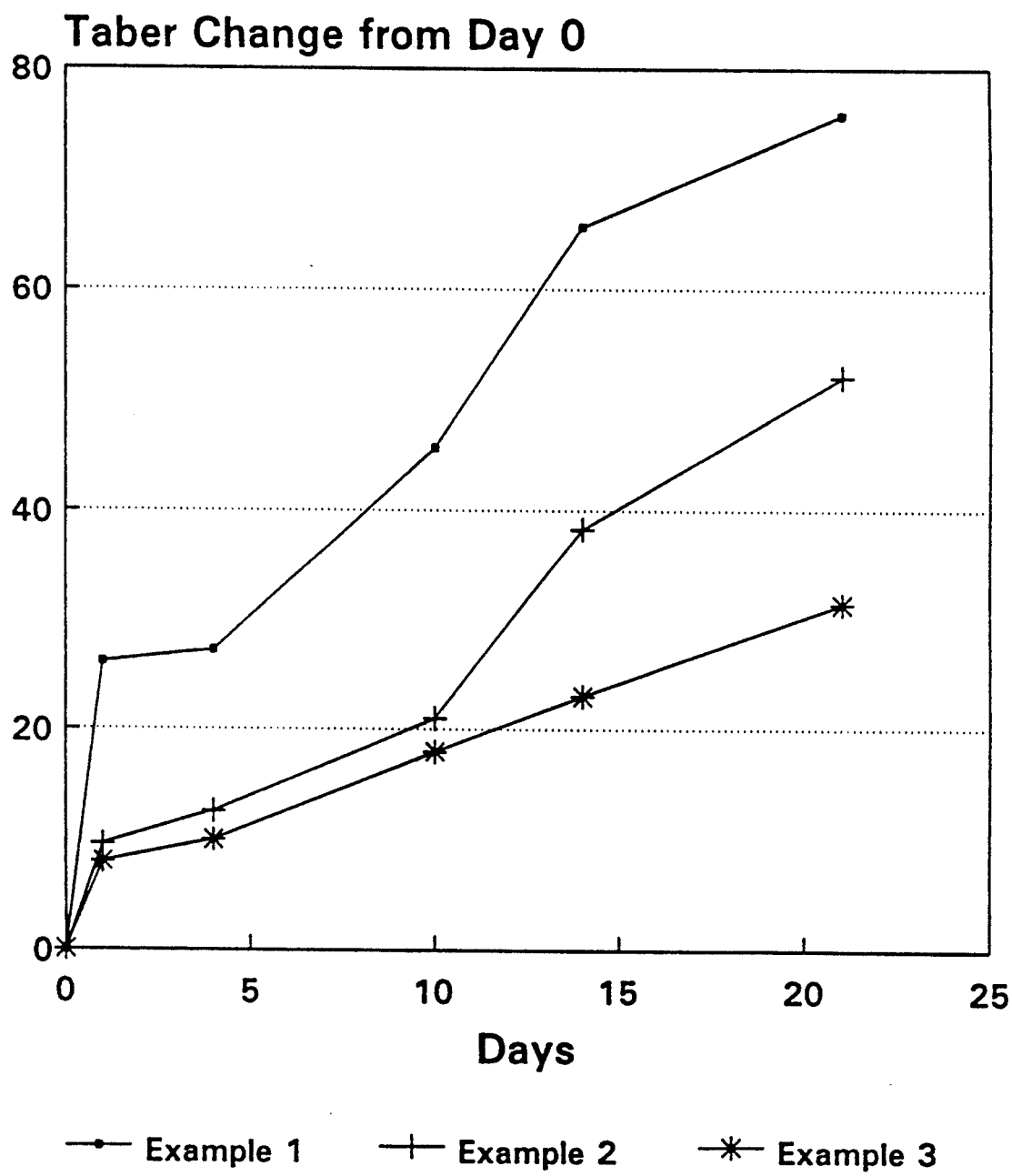
FIG. 2 shows a comparison graph of Taber stiffness value changes from Day 0 results for three samples of gum, one without any sorbitol, one using powdered sorbitol and one using the same amount of molten sorbitol.
Figure 3:
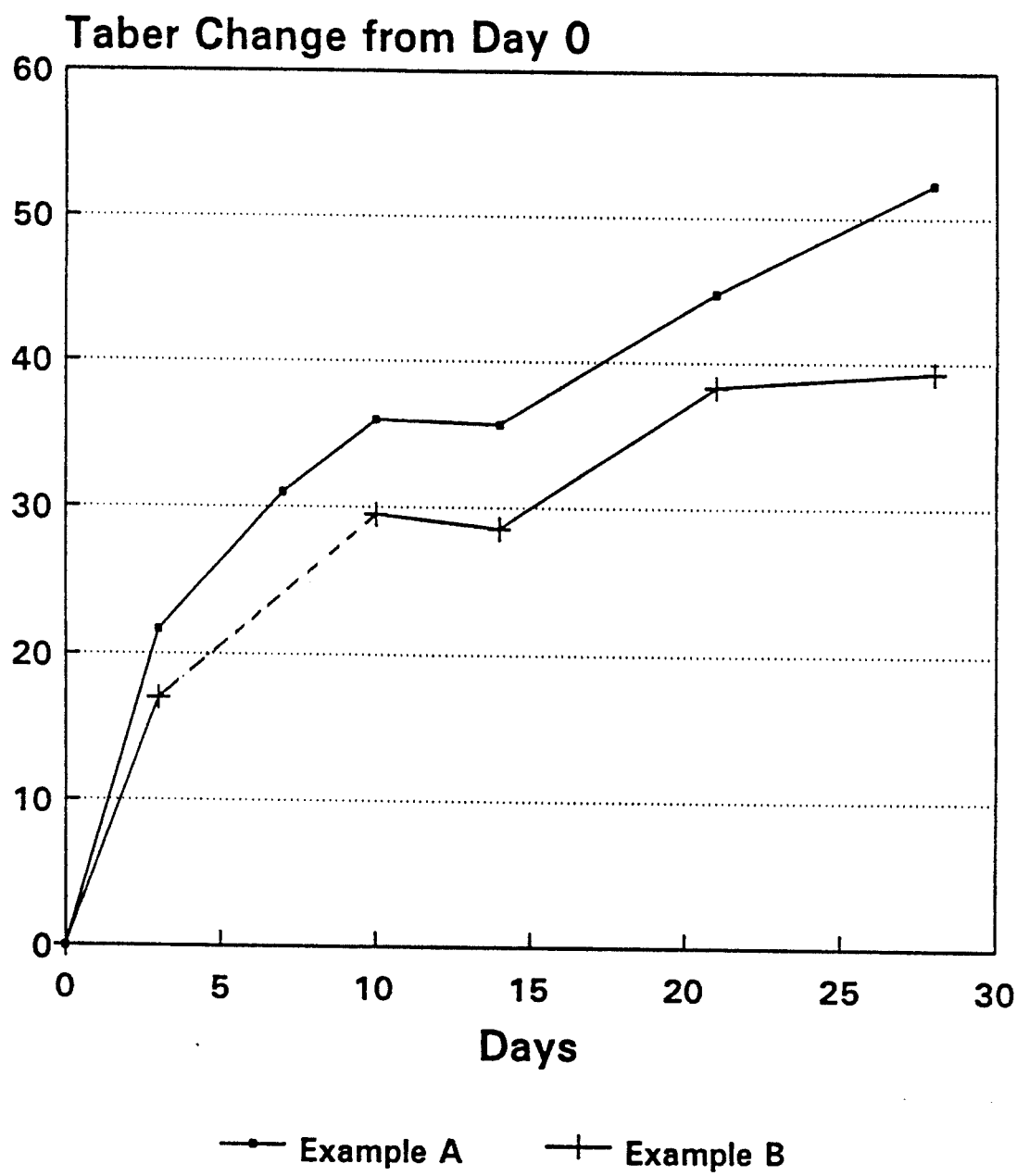
FIGS. 3–6 each show comparison graphs of Taber stiffness value changes from Day 0 results for two samples of gum with sorbitol, one of the samples using powdered sorbitol and the other sample using the same amount of molten sorbitol.
Figure 4:
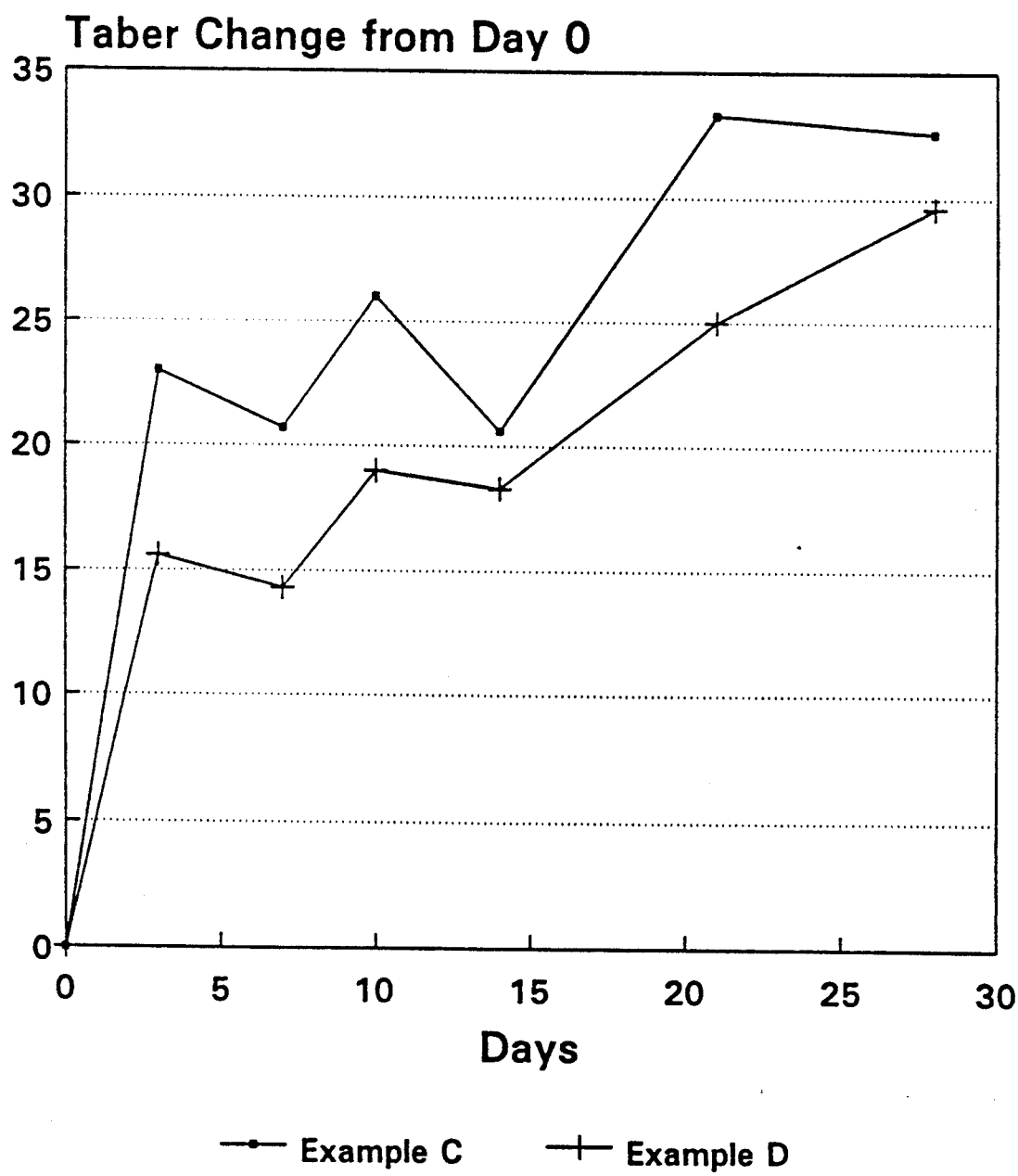
Figure 5:
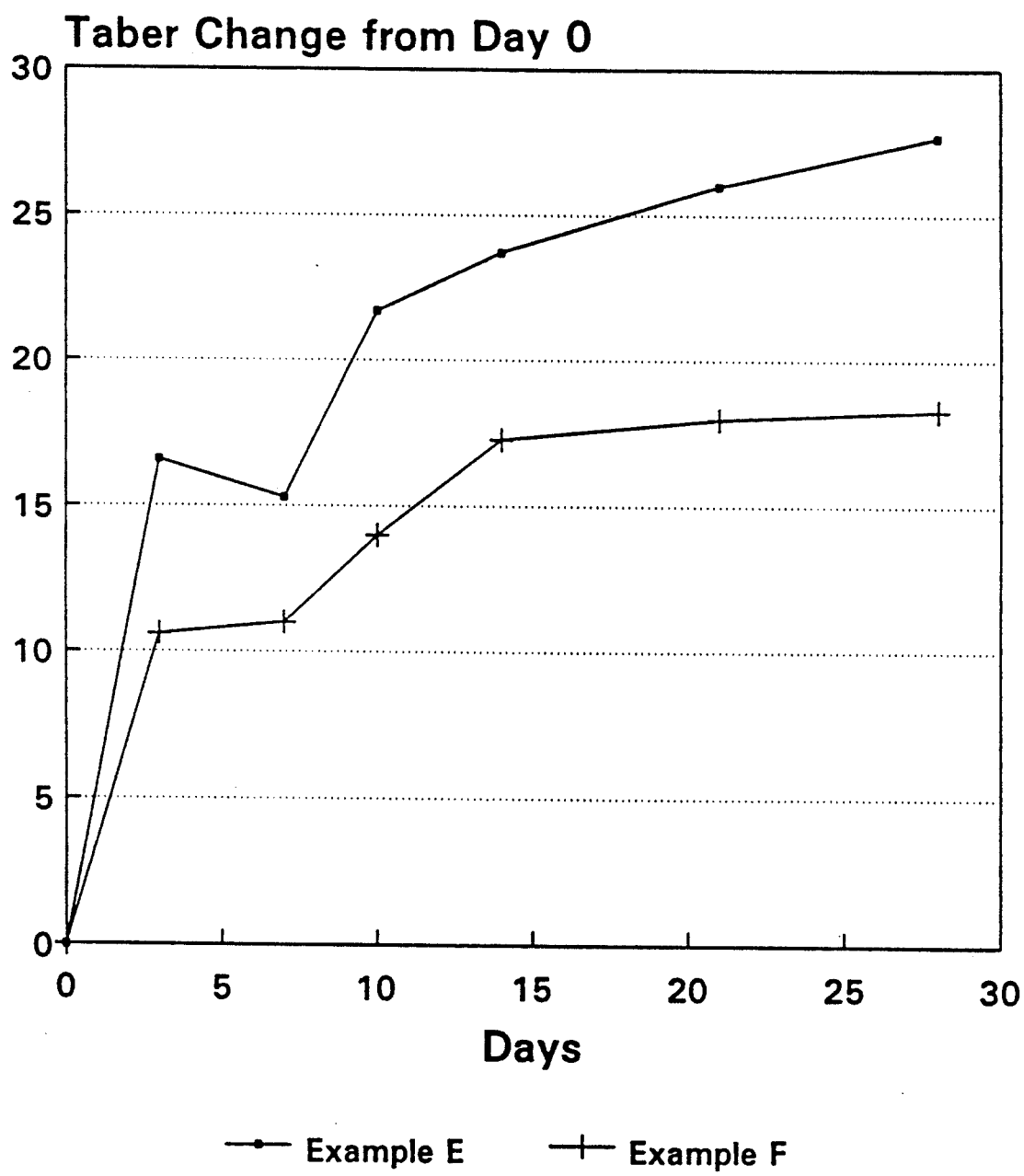
Figure 6:
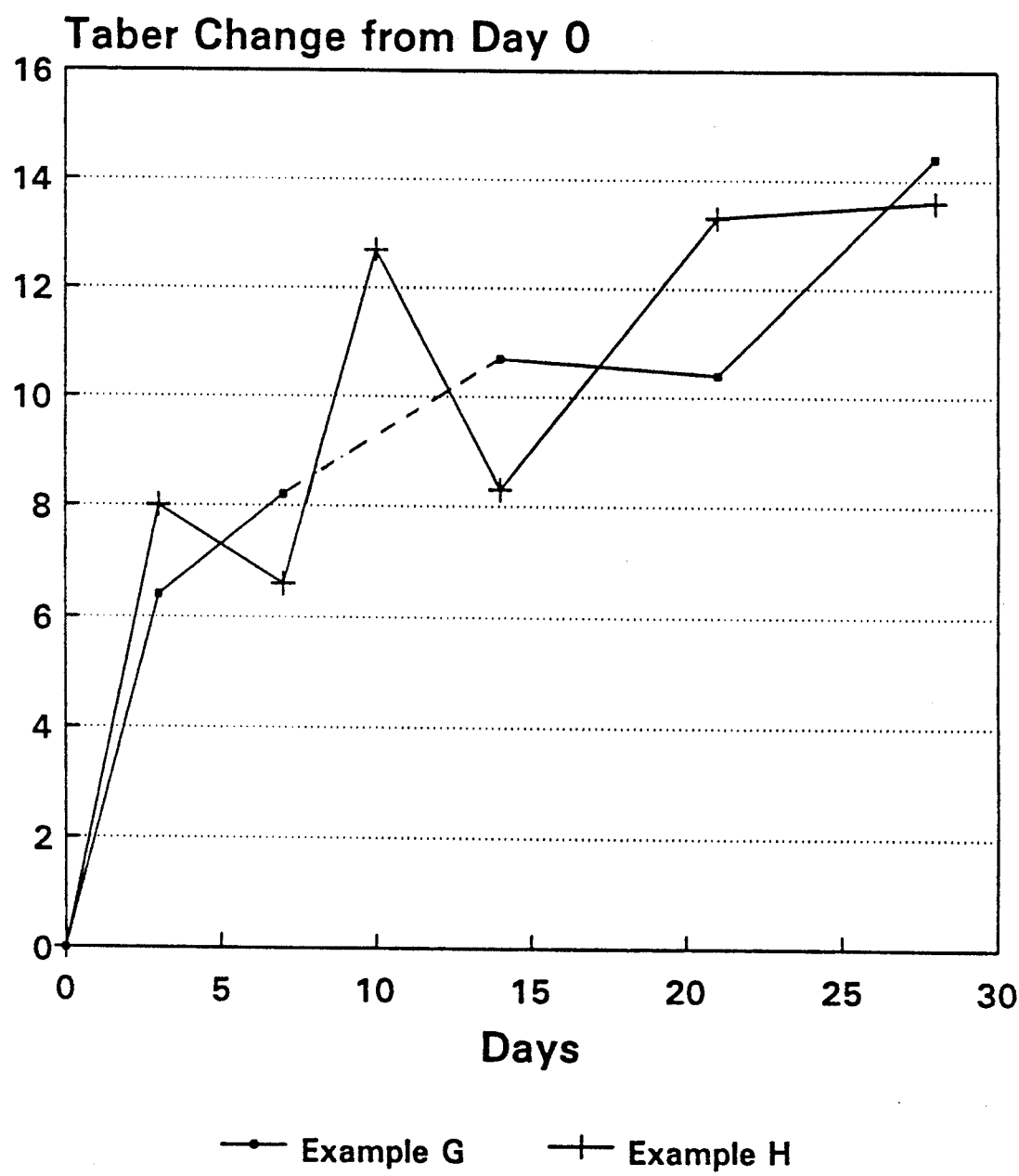

As shown in FIG. 1, the two samples with sorbitol yielded much different weight loss results than the sample without sorbitol, but not different from one another in terms of moisture loss. As shown in FIG. 2, however, the sample with molten sorbitol shows a better shelf life than the sample with powdered sorbitol, as demonstrated by the above Taber stiffness data.

The molten sorbitol as used in the present invention may be added to the gum at a level of about 0.25% to about 4%, and more preferably in a range of about 0.25% to about 2.7%. Additionally, anti-crystallization agents may be added to the molten sorbitol prior to mixing the molten sorbitol into the gum. Such anti-crystallization agents are well known in the art. They can either be dispersed or dissolved in the molten sorbitol.

The use of molten sorbitol dramatically improves the texture stability of sugar gums as measured in accelerated aging stability studies. In non-aged gum, no significant differences were noticed in sensory attributes. Also, no significant differences were noticed in the weight loss data for sugar gum containing molten sorbitol compared to sugar gum containing crystalline sorbitol.

To further demonstrate the unexpected results of the invention, eight samples of gum were made up and tested using the same process that was used to make and test the gum of Comparative Example 2 and Inventive Example 3 above. The formulas of these samples were the same as Examples 2 and 3 except the level of sorbitol was different, and the sugar level was adjusted to compensate. The following formulas were used:

TABLE 3

|  | Samples A & B | Samples C & D | Samples E & F | Samples G & H |
| --- | --- | --- | --- | --- |
| Base | 20.7 | 20.7 | 20.7 | 20.7 |
| Sugar | 53.95 | 53.45 | 52.7 | 49.2 |
| Sorbitol | 0.25 | 0.75 | 1.5 | 5.0 |
| Corn Syrup | 13.2 | 13.2 | 13.2 | 13.2 |
| Dextrose Monohydrate | 10.1 | 10.1 | 10.1 | 10.1 |
| Glycerin | 1.2 | 1.2 | 1.2 | 1.2 |
| Spearmint Flavor | 0.6 | 0.6 | 0.6 | 0.6 |

Samples A, C, E and G were made using powdered sorbitol and Examples B, D, F and H were made using molten sorbitol, melted from the same batch of powdered sorbitol as was used to make samples A, C, E and G. The sorbitol was melted as 95° C. and held at 105° C. until it was ready for use.

After the gum was made and sheeted in sticks, the sticks were stored at 75° F. and 35% RH for a Taber stiffness study. For the Taber stiffness test, three sticks were tested at 0, 3, 7, 10, 14, 21, and 28 days. Average results of the Taber test are shown below.

TABLE 4

|  | 0.25% sorbitol | | 0.75% sorbitol | | 1.5% sorbitol | | 5% sorbitol | |
| --- | --- | --- | --- | --- | --- | --- | --- | --- |
|  | A | B | C | D | E | F | G | H |
| Day 0 | 14.0 | 17.0 | 16.0 | 19.7 | 17.0 | 17.7 | 12.3 | 12.7 |
| Day 3 | 35.6 | 34.0 | 39.0 | 35.3 | 33.6 | 28.3 | 18.7 | 20.7 |
| Day 7 | 45.0 | 87.0 | 36.7 | 34.0 | 32.3 | 28.7 | 20.5 | 19.3 |
| Day 10 | 50.0 | 46.5 | 42.0 | 38.7 | 38.7 | 31.7 | 68.0 | 25.0 |
| Day 14 | 49.7 | 45.6 | 36.6 | 38.0 | 40.7 | 35.0 | 23.0 | 21.0 |
| Day 21 | 58.7 | 55.3 | 49.3 | 44.7 | 43.0 | 35.7 | 22.7 | 26.0 |
| Day 28 | 66.3 | 56.3 | 48.6 | 49.3 | 44.7 | 36.0 | 26.7 | 26.3 |

The Day 7 result for Sample B and Day 0 result for Sample G appeared to be anomalous, since these data points are so far out of line compared to all of the other data. As a result, these two points are eliminated from further analysis.

As with Examples 1–3, the initial batch-to-batch variation evidenced by the Day 0 difference was accounted for by subtracting the Day 0 result from the other data to give the Taber change from Day 0. Results are shown below and graphically in FIGS. 3–6:

TABLE 5

|  | 0.25% sorbitol | | 0.75% sorbitol | | 1.5% sorbitol | | 5% sorbitol | |
| --- | --- | --- | --- | --- | --- | --- | --- | --- |
|  | A | B | C | D | E | F | G | H |
| Day 0 | — | — | — | — | — | — | — | — |
| Day 3 | 21.6 | 17.0 | 23.0 | 15.6 | 16.6 | 10.6 | 6.4 | 8.0 |
| Day 7 | 31.0 | — | 20.7 | 14.3 | 15.3 | 11.0 | 8.2 | 6.6 |
| Day 10 | 36.0 | 29.5 | 26.0 | 19.0 | 21.7 | 14.0 | — | 12.3 |
| Day 14 | 35.7 | 28.6 | 20.6 | 18.3 | 23.7 | 17.3 | 10.7 | 8.3 |
| Day 21 | 44.7 | 38.3 | 33.3 | 25.0 | 26.0 | 18.0 | 10.4 | 13.3 |
| Day 28 | 52.3 | 39.3 | 32.6 | 29.6 | 27.7 | 18.3 | 14.4 | 13.6 |

A well accepted method of statistical analysis of this type of data is called Paired Data analysis. This is to determine if the overall data from one sample is different than the overall data of the second sample. Using this method, differences in Examples 2 vs 3 and Samples A vs B, C vs D, E vs F, and G vs H can be determined.

A standard "Student t" test is then used to determine if the overall values reported represent statistically significant differences in Tabor stiffness for samples that were made with the same amount of sorbitol but added to the gum in a different form (molten and powdered). The computations were as follows:

$$t = \frac{\bar{d}\sqrt{n}}{S_d} \quad (1)$$

where $\bar{d}$ = sum of the differences divided by the number of pairs, or the average value of the differences, or $$\bar{d} = \bar{x} - \bar{y} \text{ or } d = \frac{d_1 + d_2 + d_3 \ldots d_n}{n};$$

n = number of paired data; and $S_d$ = standard deviation of paired data calculated by the following:

$$S_d = \sqrt{\frac{d_1^2 + d_2^2 + d_3^2 \ldots d_n^2 - \overline{nd^2}}{n-1}} \quad (2)$$

Using the data in Table 2, for Examples 2 and 3, $d_1 = 1.6 d_2 = 2.6$, etc. giving the average difference $\bar{d} = 8.66$. Therefore, $$S_d = \sqrt{\frac{1.6^2 + 2.6^2 + 3.0^2 + 15.3^2 + 20.8^2 - 5(8.66)^2}{4}}$$

$$S_d = \sqrt{\frac{685.05 - 374.98}{3}} = \sqrt{\frac{310.07}{4}} = \sqrt{77.5} = 8.80.$$

Substituting $S_d = 8.80$ into equation (1) gives:

$$t = \frac{8.66 \sqrt{5}}{8.80} = \frac{8.66 \times 2.236}{8.80} = 2.20$$

The critical t value at a 90% confidence level and 4 Degrees of Freedom is 2.13. Since the calculated value is 2.20, there is a 90% confidence level that the Taber change for Example 2 is different than the Taber change for Example 3.

For Samples A vs B, using the 5 pairs of data (not including Day 7 with the anomalous result), the following calculations were made:

$$\bar{d} = \frac{37.6}{5} = 7.52$$

$$S_d = \sqrt{\frac{41.03}{4}} = \sqrt{10.25} = 3.20$$

$$t = \frac{7.52}{3.20} \times \sqrt{5} = 5.25$$

The critical t value at a 99% confidence level and 4 Degrees of Freedom is 4.604. Since the calculated value is greater, there is a 99% confidence level that the Taber change for Sample B is different than the Taber change for Sample A.

For Samples C vs D using the 6 pairs of data, the following calculations were made:

$$\bar{d} = \frac{34.4}{6} = 5.73$$

$$S_d = \sqrt{\frac{30.90}{5}} = \sqrt{6.18} = 2.49$$

$$t = \frac{5.73 \times \sqrt{6}}{2.49} = 5.64$$

The critical t value at a 99% confidence level and 5 Degrees of Freedom is 4.03. Since the calculated t value is greater, there is a 99% confidence level that the Taber change for Sample D is different than the Taber change for Sample C.

For Samples E vs F using the 6 pairs of data, the following calculations were made:

$$\bar{d} = \frac{41.8}{6} = 6.97$$

$$S_d = \sqrt{\frac{15.61}{5}} = \sqrt{3.122} = 1.77$$

$$t = \frac{6.97 \times \sqrt{6}}{1.77} = 9.65$$

Again, the critical t value at a 99% confidence level and 5 Degrees of Freedom is 4.03. Since the calculated t value is greater, there is a 99% confidence level that the Taber change for Sample F is different than the Taber change for Sample E.

For Samples G vs H using the 5 pairs of data, (not including Day 10 with the anomalous result), the following calculations were made:

$$\bar{d} = \frac{0.3}{5} = 0.06$$

$$S_d = \sqrt{\frac{19.91}{4}} = \sqrt{4.978} = 2.23$$

$$t = \frac{0.06 \sqrt{5}}{2.23} = 0.06$$

The first indication that data from Sample G is similar to data from Sample H is that the algebraic average $\bar{d}$ is near 0. The critical t value, at a 80% confidence level for 4 Degrees of Freedom, is 0.74. Since the calculated t value is lower, the Taber change for Sample H is not significantly different from the Taber change for Sample G.

These results show that, especially for Samples A and B, C and D, E and F, and Examples 2 and 3, respectively made with 0.25%, 0.75%, 1.5% and 2.7% sorbitol, the use of molten sorbitol made a statistically significant improvement in Taber values compared to the use of powdered sorbitol. The data for Samples G and H did not show a statistically significant difference in Taber values.

The results of these tests show that for levels of sorbitol in the range of 0.25% to at least 2.7%, and most probably to about 4%, the use of molten sorbitol produces unexpected results in improving the shelf life of gum.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes that come within the meaning and range of equivalency of the claims are to be embraced within their scope.

We claim:

1. A method of producing a chewing gum composition comprising the steps of:
    a) providing a chewing gum base at a level of about 5% to about 80% of the chewing gum composition;
    b) providing a bulking agent at a level of about 5% to about 80% of the chewing gum composition;
    c) providing a flavoring agent at a level of about 0.1% to about 10% of the chewing gum composition;
    d) providing molten sorbitol at a level of about 0.25% to about 2.7% of the chewing gum composition; and
    e) mixing said gum base, bulking agent, flavoring agent and molten sorbitol into said chewing gum composition.

2. The method of claim 1 wherein the bulking agent comprises one or more sugar sweeteners.

3. The method of claim 1 wherein an anti-crystallization agent is mixed with the molten sorbitol before the molten sorbitol is mixed with the other gum composition ingredients.

4. The method of claim 1 wherein the gum base is melted and mixed with the molten sorbitol prior to mixing the gum base with the bulking and flavoring agents.

5. The method of claim 1 further comprising the steps of providing a softening agent in the range of about 0.5% to about 15% of the chewing gum composition and mixing said softening agent into the gum composition.

6. The method of claim 5 wherein the softening agent is selected from the group consisting of glycerine, lecithin, aqueous sorbitol liquid and mixtures thereof.

7. The method of claim 1 further comprising the step of mixing a binding agent into the gum composition, the binding agent being selected from the group consisting of hydrogenated starch hydrolyzates, corn syrup and combinations thereof.

8. A chewing gum composition made in accordance with the method of claim 1.

9. A chewing gum composition made in accordance with the method of claim 2.

10. A chewing gum composition made in accordance with the method of claim 3.

11. A chewing gum composition made in accordance with the method of claim 4.

12. A chewing gum composition made in accordance with the method of claim 5.

13. A chewing gum composition made in accordance with the method of claim 6.

14. A chewing gum composition made in accordance with the method of claim 7.

15. The method of claim 1 wherein the bulking agent is in a powdered form.

16. A chewing gum composition made in accordance with the method of claim 15.

* * * * *

UNITED STATES PATENT AND TRADEMARK OFFICE
CERTIFICATE OF CORRECTION

PATENT NO. : 5,223,282        Page 1 of 2
DATED : June 29, 1993
INVENTOR(S) : MANSUKH M. PATEL It is certified that error appears in the above-indentified patent and that said Letters Patent is hereby corrected as shown below:

Column 3, line 59, please delete "chucks" and substitute therefor --chunks--.

Column 4, line 66, please delete "Tabor" and substitute therefor --Taber--.

Column 4, line 67, please delete "changes" and substitute therefor --change--.

Column 5, line 62, please delete "as" and substitute therefor --at--.

Column 6, in Table 4, across from "Day 7" and under Column "B", please delete "87.0" and substitute therefor --87.0--.

Column 6, in Table 4, across from "Day 10" and under Column "G", please delete "68.0" and substitute therefor --68.0--.

Column 6, line 13, please delete "Day 0" and substitute therefor --Day 10--.

UNITED STATES PATENT AND TRADEMARK OFFICE
CERTIFICATE OF CORRECTION

PATENT NO. : 5,223,282
DATED : June 29, 1993
INVENTOR(S) : MANSUKH M. PATEL

It is certified that error appears in the above-indentified patent and that said Letters Patent is hereby corrected as shown below:

Column 6, line 56, after "or" the second equation should be:

$$\overline{d} = \frac{d_1 + d_2 + d_3 \ldots d_n}{n}$$

Column 6, line 67, after "$d_l=1.6$" please insert -- , --.

Column 7, line 5, the equation should be:

$$S_d = \sqrt{\frac{685.05 - 374.98}{4}} = \sqrt{\frac{310.07}{4}} = \sqrt{77.5} = 8.80$$

Signed and Sealed this

Twenty-sixth Day of July, 1994

Attest:

BRUCE LEHMAN

*Attesting Officer*  *Commissioner of Patents and Trademarks*